United States Patent
Tasma et al.

(10) Patent No.: US 7,562,761 B2
(45) Date of Patent: Jul. 21, 2009

(54) SLAT DRIVEN POSITIVE DISPLACEMENT SORTER

(75) Inventors: Ryan D. Tasma, Middleville, MI (US); David H. Cotter, Coopersville, MI (US); Ted W. Haan, Wyoming, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 11/947,319

(22) Filed: Nov. 29, 2007

(65) Prior Publication Data

US 2008/0116036 A1    May 22, 2008

Related U.S. Application Data

(63) Continuation-in-part of application No. 11/738,573, filed on Apr. 23, 2007.

(60) Provisional application No. 60/745,668, filed on Apr. 26, 2006.

(51) Int. Cl.
*B65G 47/10* (2006.01)
(52) U.S. Cl. .............................. 198/370.02; 198/890.1; 198/370.07; 198/463.2
(58) Field of Classification Search ............ 198/370.01, 198/370.02, 890.1, 370.07, 463.2, 845
See application file for complete search history.

(56) References Cited

U.S. PATENT DOCUMENTS

| | | | | |
|---|---|---|---|---|
| 5,127,510 A | * | 7/1992 | Cotter et al. | 198/370.02 |
| 5,131,522 A | * | 7/1992 | Fujio | 198/370.02 |
| 5,217,103 A | * | 6/1993 | Umlauf | 198/890.1 |
| 5,590,758 A | * | 1/1997 | Wilkins et al. | 198/890.1 |
| 6,705,452 B2 | * | 3/2004 | Greve et al. | 198/370.02 |
| 6,814,216 B2 | * | 11/2004 | Veit et al. | 198/370.02 |
| 6,860,383 B2 | * | 3/2005 | Veit et al. | 198/815 |
| 6,866,136 B2 | * | 3/2005 | Veit et al. | 198/370.02 |
| 7,086,519 B2 | * | 8/2006 | Veit et al. | 198/370.02 |
| 7,090,071 B2 | * | 8/2006 | Enomoto | 198/841 |
| 7,117,988 B2 | * | 10/2006 | Veit et al. | 198/802 |

OTHER PUBLICATIONS

Japan Patent 61-24500 dated Jul. 23, 1986, by Yoji Shirai of the Daifuku Kiko Co., Ltd. as submitted by the applicant on Nov. 29, 2007.*
International Search Report and Written Opinion from corresponding Patent Cooperation Treaty Application No. PCT/US07/85253, mailed Sep. 9, 2008.

* cited by examiner

*Primary Examiner*—Douglas A Hess
(74) *Attorney, Agent, or Firm*—Van Dyke, Gardner, Linn & Burkhart, LLP (57) ABSTRACT

An article sorter is made up of a web defined by a plurality of interconnected, laterally elongated, slats. An upper portion of the web defines a longitudinally extending conveying surface. Each of the slats has a generally planar upper surface forming a portion of the conveying surface. A plurality of pusher shoes travel laterally of the conveying surface to laterally displace articles on the conveying surface. A drive assembly is provided. The drive includes at least one sprocket and a motor. The motor is adapted to rotate the sprocket(s). The sprocket(s) engage the slats to propel the web.

39 Claims, 13 Drawing Sheets

SLAT DRIVEN POSITIVE DISPLACEMENT SORTER

CROSS REFERENCE TO RELATED APPLICATION

This is a continuation-in-part application of U.S. patent application Ser. No. 11/738,573, filed Apr. 23, 2007, which claims the benefit of U.S. patent application Ser. No. 60/745,668, filed Apr. 26, 2006, the entire disclosures of which are hereby incorporated herein by reference.

BACKGROUND OF THE INVENTION

The present invention is directed to article sorters and, in particular, to positive displacement sorters in which pusher shoes traveling with the conveying surface selectively laterally displace articles on the conveying surface such as to a selected spur.

In one type of positive displacement sorter, such as disclosed in commonly assigned U.S. Pat. No. 5,127,510, the web defining the conveying surface is made up of a plurality of slats that are connected at opposite ends to endless chains. The pusher shoes travel laterally along one or more slats. Wheels mounted to the chain support the web. The chains are driven by motor driven chain sprockets which propel the web.

In another type of positive displacement sorter, such as disclosed in commonly assigned U.S. Pat. No. 6,814,216, the web defining the conveying surface is made up of a plurality of slats that are each supported by one or more wheels supporting each slat and members interconnecting adjacent slats. The pusher shoes travel laterally along one or more slats. The web is driven by a linear motor system made up of motor primaries distributed beneath the web and secondary plates attached to the slats.

SUMMARY OF THE INVENTION

An article sorter, according to an aspect of the invention, is made up of a web defined by a plurality of interconnected, laterally elongated, slats. An upper portion of the web defines a longitudinally extending conveying surface. Each of the slats has a generally planar upper surface forming a portion of the conveying surface. A plurality of pusher shoes travel laterally of the conveying surface to laterally displace articles on the conveying surface. A drive assembly is provided that includes a sprocket and a motor. The motor rotates the sprocket. The sprocket engages the slats to propel the web.

The sprocket may engage the slats between first and second lateral portions of the web. The first lateral portion of the web is where the pusher shoes are in a non-diverted state and the second opposite lateral portion of the web is where the shoes are in a diverted state after the pusher shoes have traveled across the web to divert an article.

Complementary surface portions may be defined between the sprocket and the slats to propel the web. The complementary surface portions may include an extension of the sprocket engaging a recess in the slats, or vice versa. The extension may be formed as a gear tooth. The extension may be made from an impact-absorbing material, such as a polymeric material.

The article sorter may include a track assembly having an upper track portion and an end track portion. The upper track portion is adapted to support the upper portion of the web. The end track portion is adapted to support a portion of the web at the sprocket. The article sorter may further include a wheel assembly supporting each lateral side of the web. The wheel assembly engages the track. The wheel assembly may include a plurality of wheels, with the sprocket engaging one of said slats between said plurality of wheels. The track assembly may be made up of a generally continuous track assembly.

The motor may be in the form of a motorized roller with the sprocket mounted to an outer surface of said motorized roller. Alternatively, the sprocket may be mounted to a shaft with the motor rotating the shaft.

These and other objects, advantages and features of this invention will become apparent upon review of the following specification in conjunction with the drawings.

DESCRIPTION OF THE PREFERRED EMBODIMENT

Figure 1:
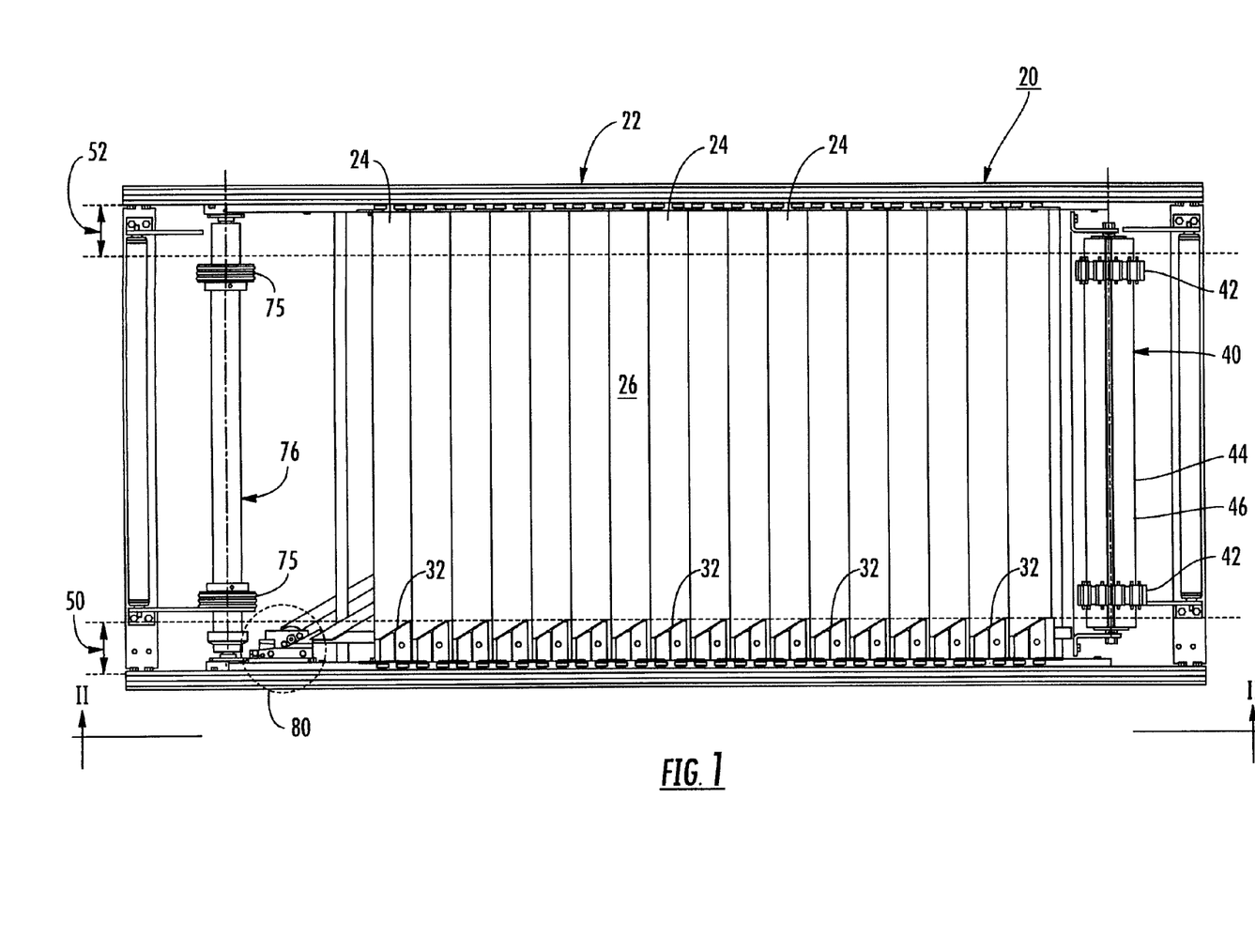
FIG. 1 is a top plan view of an embodiment of an article sorter, with upstream and downstream portions of the conveying surface removed to reveal internal details thereof.

Referring now to the drawings and the illustrative embodiments depicted therein, an article sorter 20 is made up of an endless web 22 that is moveably supported by a frame assembly 23 (FIG. 1). Web 22 is made up of a plurality of laterally elongated slats 24. An upper portion of web 22 defines a conveying surface 26 moving in a longitudinal direction. Each slat 24 has an upper surface 28 and a lower surface 30. Upper surface 28 is generally flat, or planar, such that article sorter 20 is known as a flat-top sorter. It should be understood that considerable variation in the shape of upper surface 28 from a true plane can be accommodated without negating it being generally flat or planer. Article sorter 20 additionally includes a plurality of pusher shoes 32 which travel with the web in the longitudinal direction and can be diverted laterally in order to displace an article traveling on conveying surface 26. Pusher shoes 32 travel along one or more slats and can be of any configuration known in the art. Examples of pusher shoes 32 are disclosed in commonly assigned U.S. Pat. Nos. 5,127,510; 6,814,216; and 6,860,383; and U.S. Patent Application Publication No. 2005/0023108, the disclosures of which are hereby collectively incorporated herein by reference. Also, a lateral stabilizer 33 is defined between each pusher shoe 32 and slat 24 as described in the preceding patents.

A divert switch assembly 80 selectively diverts one or more pusher shoes 32 to a diverting rail 82 to divert the pusher shoe(s) from a non-diverted state, represented by lateral portion 50 of the conveying surface, to a diverted state, represented by lateral portion 52 of the conveying surface. This lateral movement of the pusher shoe(s) displaces an article, such as to a take-away spur (not shown), for sortation. Diverted pusher shoes are returned to a non-diverted state by a return rail 84. In the illustrated embodiments, article sorter 20 is shown with a single divert switch assembly and diverting rail to provide the ability to divert an article to a single spur. However, multiple such divert switch and diverting rail combinations can be provided for article sorter 20 to allow sortation to multiple spurs.

Figure 5:
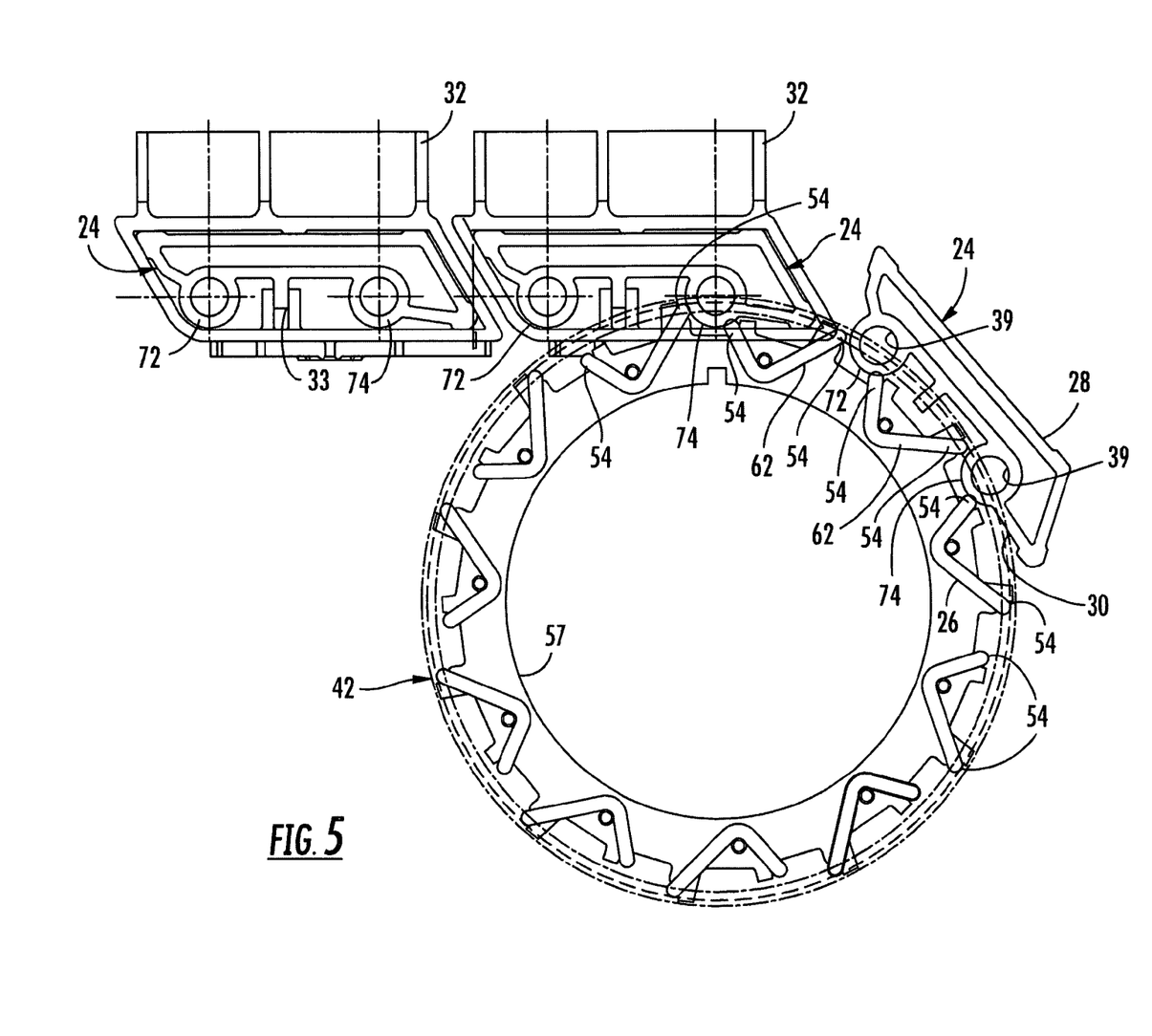
FIG. 5 is a side elevation of the drive assembly driving the web.
Figure 5A:
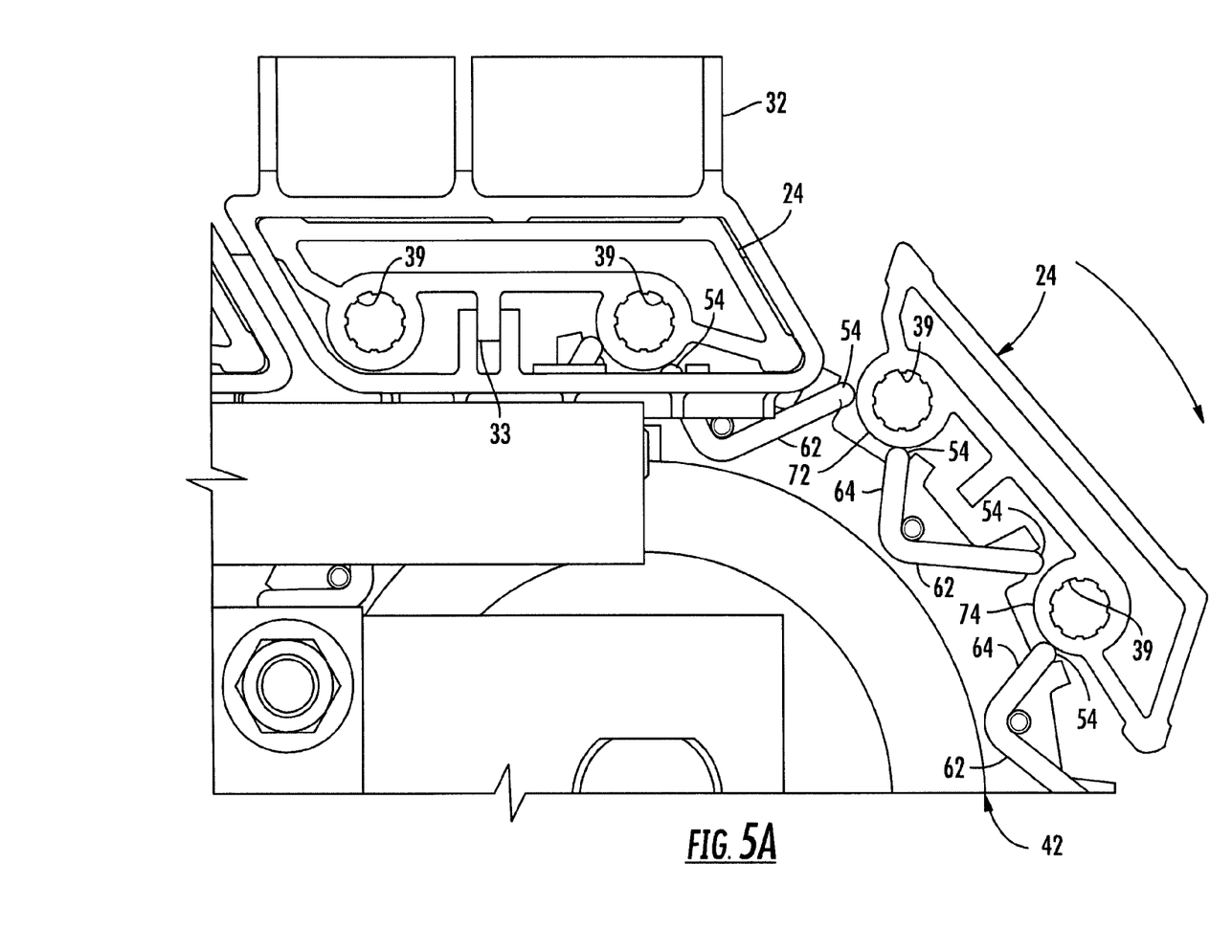
FIG. 5a is an enlargement of a portion of the drive assembly in FIG. 5 to show greater detail thereof.
Figure 10:
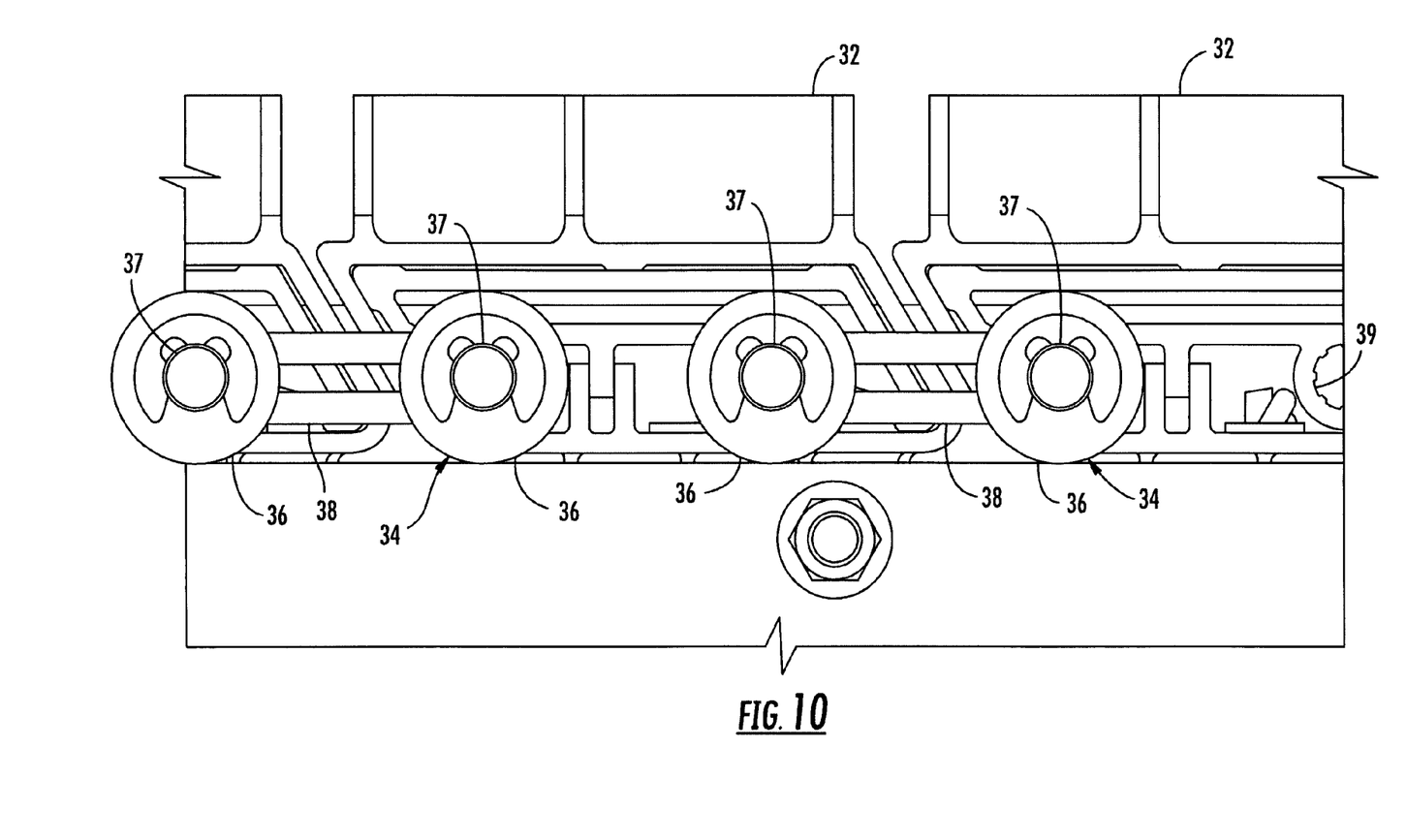
FIG. 10 is a side elevation of a wheel assembly.

Web 22 is supported on frame assembly 23 by a wheel assembly 34. Wheel assembly 34 includes a series of wheels 36 and links 38 (FIG. 10). In the illustrated embodiment, two wheels are mounted to each end of each slat 24 and adjacent wheels of adjacent slats are joined by links 38. Links 38 pivot about the axles 37 of the joined wheels to accommodate rotation between slats as they move around the ends of the web, as illustrated in FIGS. 5 and 5a. Wheels 36 are rotatably mounted to their respective slats by the fixed positioning of their respective axle 37 in an opening 39 in their slat. The axle may be fixed to the slat by press-fit, by fasteners, or the like. Other arrangements for interconnecting and supporting slats 24, such as chains, are known in the art and may be used without deviating from the spirit of the present invention.

Web 22 is driven by a drive assembly 40. Drive assembly 40 includes at least one sprocket 42, although two are used in the illustrated embodiment, and an electric motor 44 for rotating the sprocket(s). Motor 44 may be in the form of a motorized roller in which the motor windings are internal to the roller and drive an outer shell 46 to which the sprocket(s) are attached. Such motorized rollers are well known in the art and come in various configurations, including alternating current, direct current, gear driven, direct driven, and the like. In the illustrated embodiment, motor 44 is a direct driven motorized roller having a 110 millimeter diameter outer shell 46 and a motor that is operated at 48 volts direct current. Alternatively, sprocket(s) 42 may be shaft mounted and driven by an external motor rotating the shaft. The use of an external motor may be especially effective for longer conveying surfaces, such as ones which provide sortation to multiple spurs because it is capable of a wide range of output power.

Each sprocket is positioned laterally between lateral portion 50 of conveying surface 26, where non-diverted pusher shoes are located, and lateral portion 52 of the conveying surface, where diverted pusher shoes are located (FIG. 1). This placement of sprocket(s) 42 avoids interference with the pusher shoes while allowing the pusher shoes to be closer to the lateral edge of the conveying surface than if the sprocket(s) were to be located at extreme ends of shell 46. This reduces the overall width of the conveying surface without restricting the article conveying area and ensures a more reliable divert by providing guidance of the article until it is essentially fully off of the conveying surface.

Figure 6:
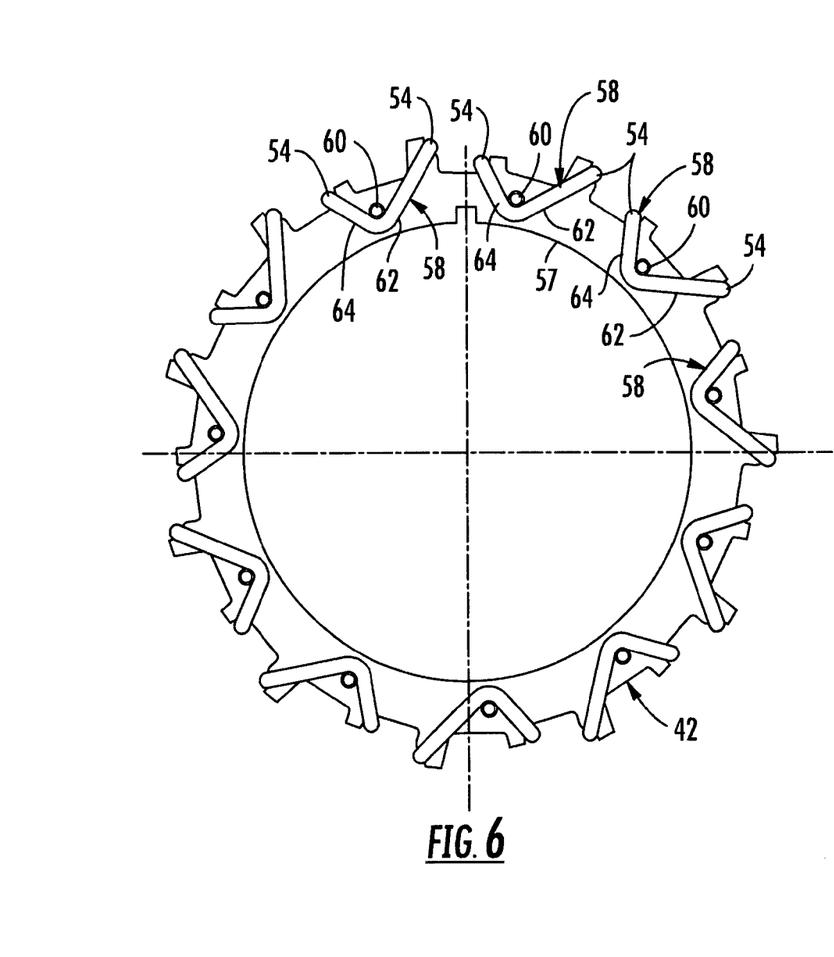
FIG. 6 is a side elevation of a sprocket.
Figure 7:
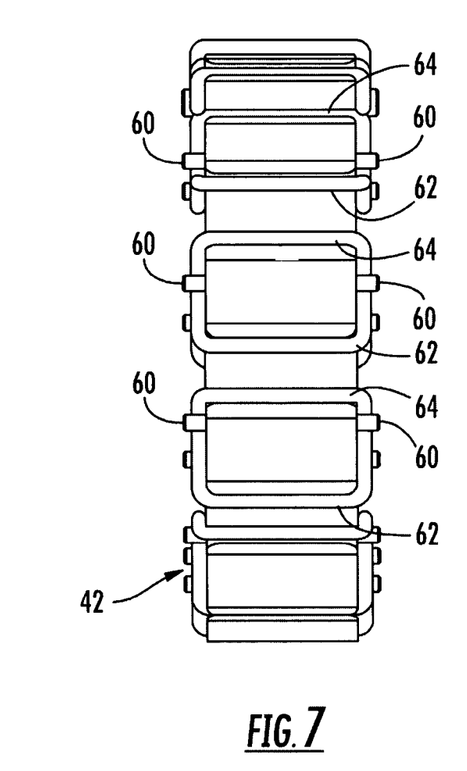
FIG. 7 is an end elevation of the sprocket in FIG. 6.
Figure 8:
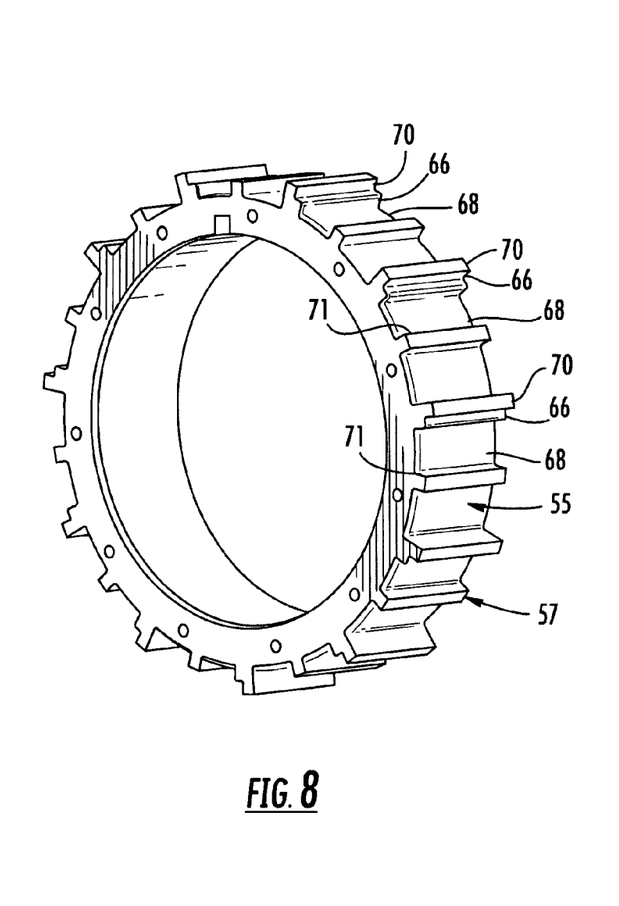
FIG. 8 is a perspective view of a sprocket core.
Figure 9:
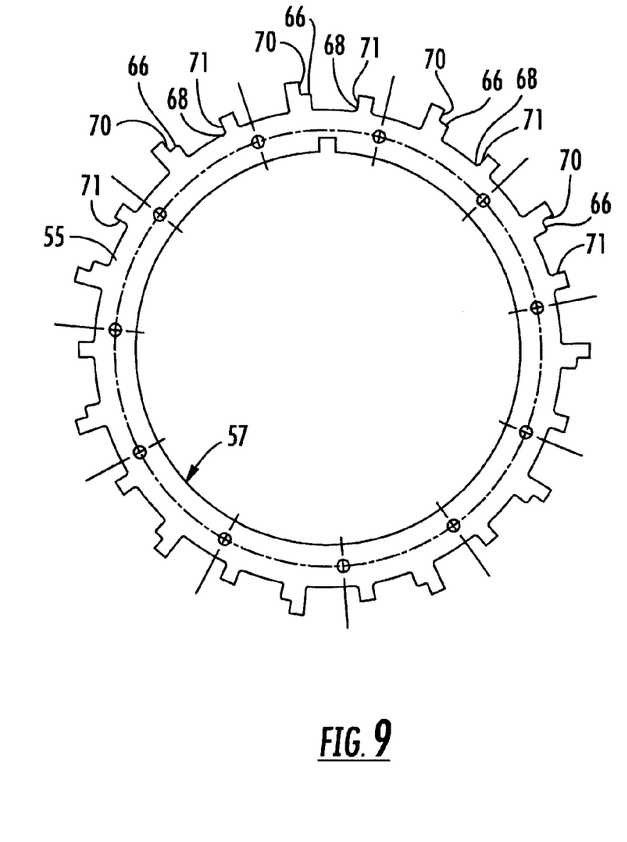
FIG. 9 is a side elevation of the sprocket core in FIG. 8.

Each sprocket 42 has portions 54 that engage a slat in order to propel the web. Portions 54 are made from an impact-absorbing material. This has the effect of significantly reducing noise generated by the driving of the web. In the illustrated embodiment, the material of portions 54 is a polymeric material, specifically polyurethane. Other impact absorbing material may be used. Web-engaging portions 54 are provided in the illustrated embodiment by a series of bands, such as O-rings 58, that are stretched across the face 55 of a core 57. O-rings 58 are stretched around pins 60 that protrude laterally from opposite sides of core 57. This divides each O-ring into a first lobe 62 and a second lobe 64 stretched across the face 55 of core 57. When viewed from the side, as illustrated in FIG. 6, first lobe 62 is a greater distance from the center of rotation of core 57 than is second lobe 64. First lobe 62 is positioned in this manner by a first land 66 and second lobe 64 is positioned in this manner by a second land 68, with first land 66 being elevated with respect to the second land. First lobe 62 is also supported by a first adjacent surface 70, extending perpendicular to first land 66. Second lobe 64 is also supported by a second adjacent surface 71 extending perpendicular to second land 68. As will be explained in more detail below, first lobe 62 both supports and propels a slat 24 while second lobe 64 supports the slat.

Each slat 24 includes a first protrusion 72 and a second protrusion 74 defined in lower surface 30. First and second lobes 62, 64 support and propel the slat by acting upon protrusions 72 and 74. In the illustrated embodiment, protrusions 72, 74 also define openings 39 for mounting of wheels 36. As can best be seen by reference to FIGS. 5 and 5a, each protrusion 72, 74 is cradled between a slat-engaging portion 54 of first lobe 62 of one O-ring 58 and a slat-engaging portion 54 of second lobe 64 of an adjacent O-ring. The slat-engaging portion 54 of first lobe 62 engages higher on the protrusion to ensure that rotational force of the sprocket is transferred to the slat and, hence, to the web.

The use of urethane O-rings has several advantages. The core of sprocket 42 can be made of a more durable material, such as steel, aluminum, or the like, while still providing an impact absorbent interface to the slats. Also, the O-rings can be readily assembled and readily replaced for maintenance purposes. Also, this configuration is more economical than making the entire sprocket from urethane. O-rings are less expensive than an entire urethane sprocket.

Figure 2:
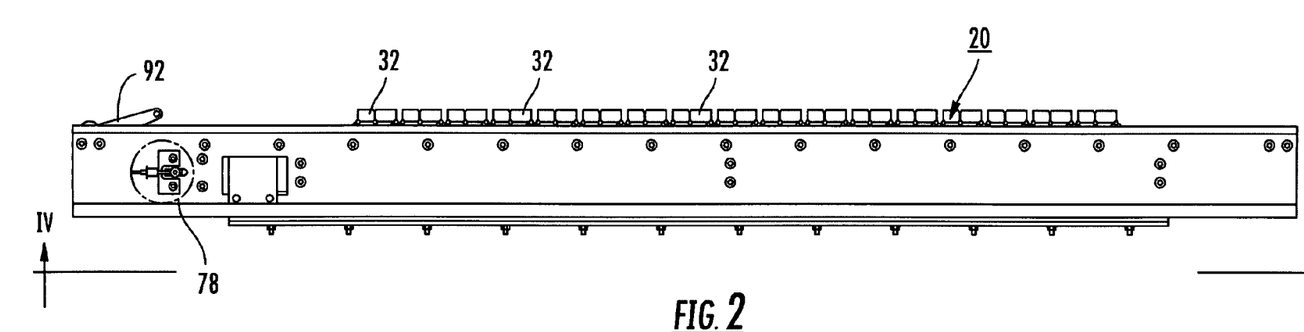
FIG. 2 is a side elevation taken from the direction II-II in FIG. 1.
Figure 3:
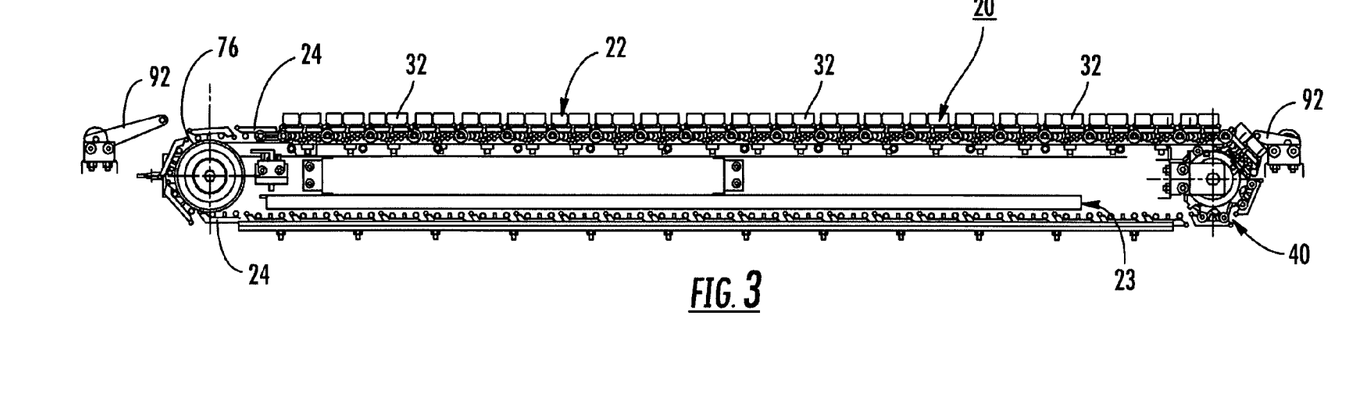
FIG. 3 is the same view as FIG. 2 with the side member removed to reveal internal structure thereof.
Figure 4:
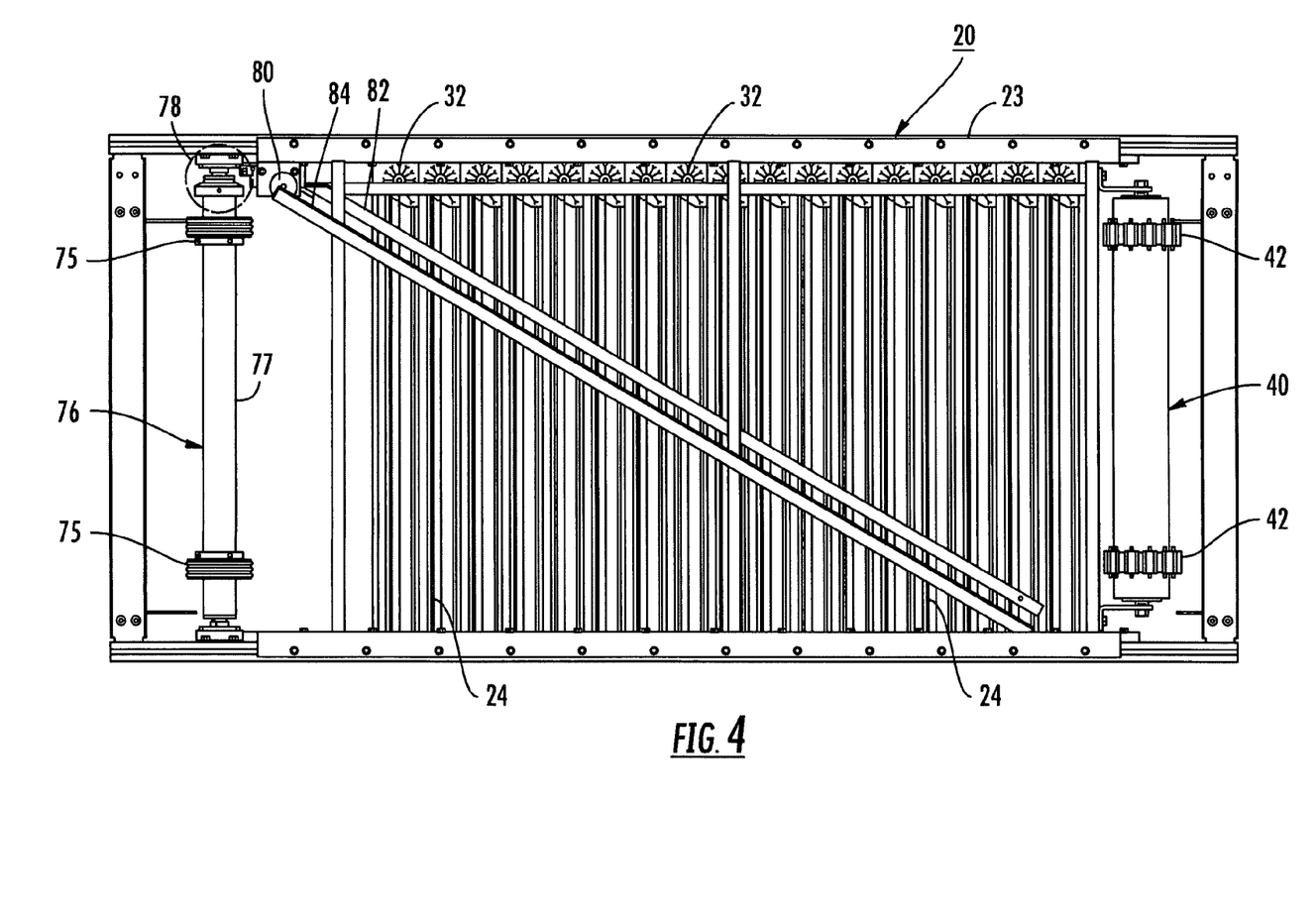
FIG. 4 is a bottom plan view taken from the direction IV-IV in FIG. 2.

An end of web 22 opposite drive assembly 40 includes an idler pulley assembly 76. Idler pulley assembly 76 includes a pair of pulleys 75 rotatably mounted by a shaft 77. A take-up assembly 78 is provided to idler pulley assembly 76 to remove any slack from the web and accommodate expansion and contraction of the web, such as due to temperature. In the illustrated embodiment, take-up assembly 78 includes a spring-biasing member, as best illustrated in FIG. 2. Transition members 92 provide transition from a feed conveyor (not shown) feeding articles to conveying surface 26 and between conveying surface 26 and a take-away conveyor (not shown) taking away articles exiting the end of conveying surface 26.

Figure 11:
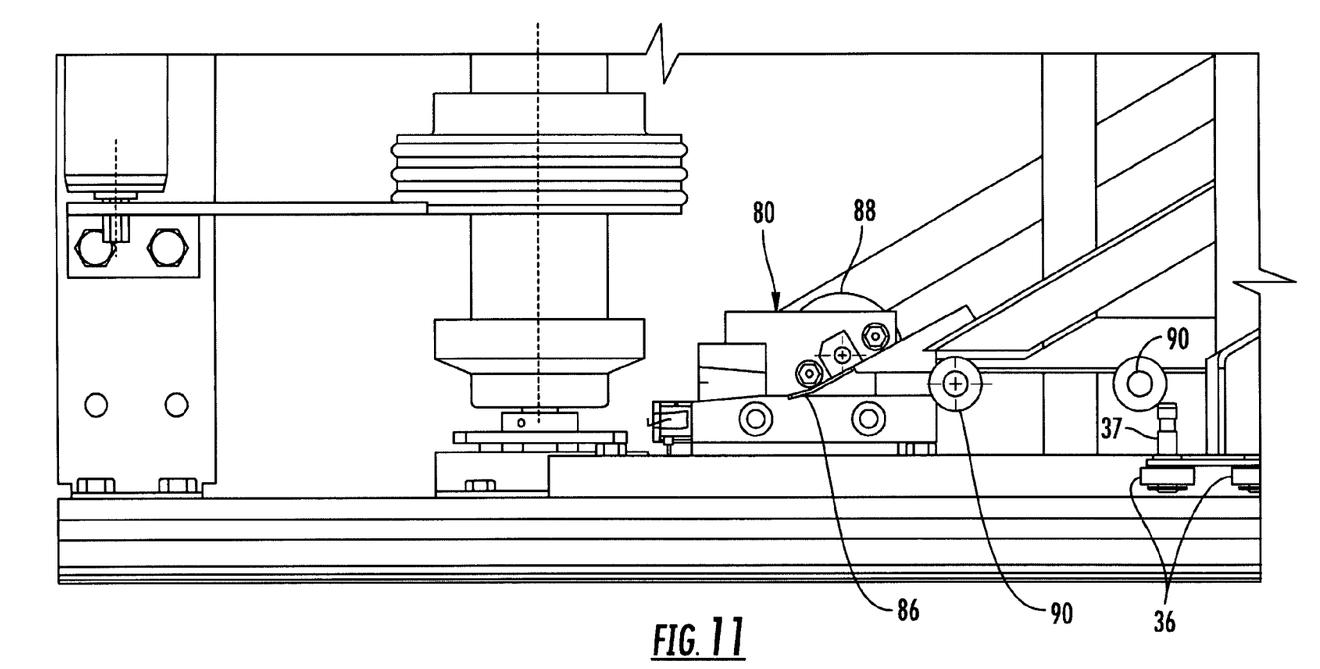
FIG. 11 is a top plan view of a diverter switch assembly.
Figure 12:
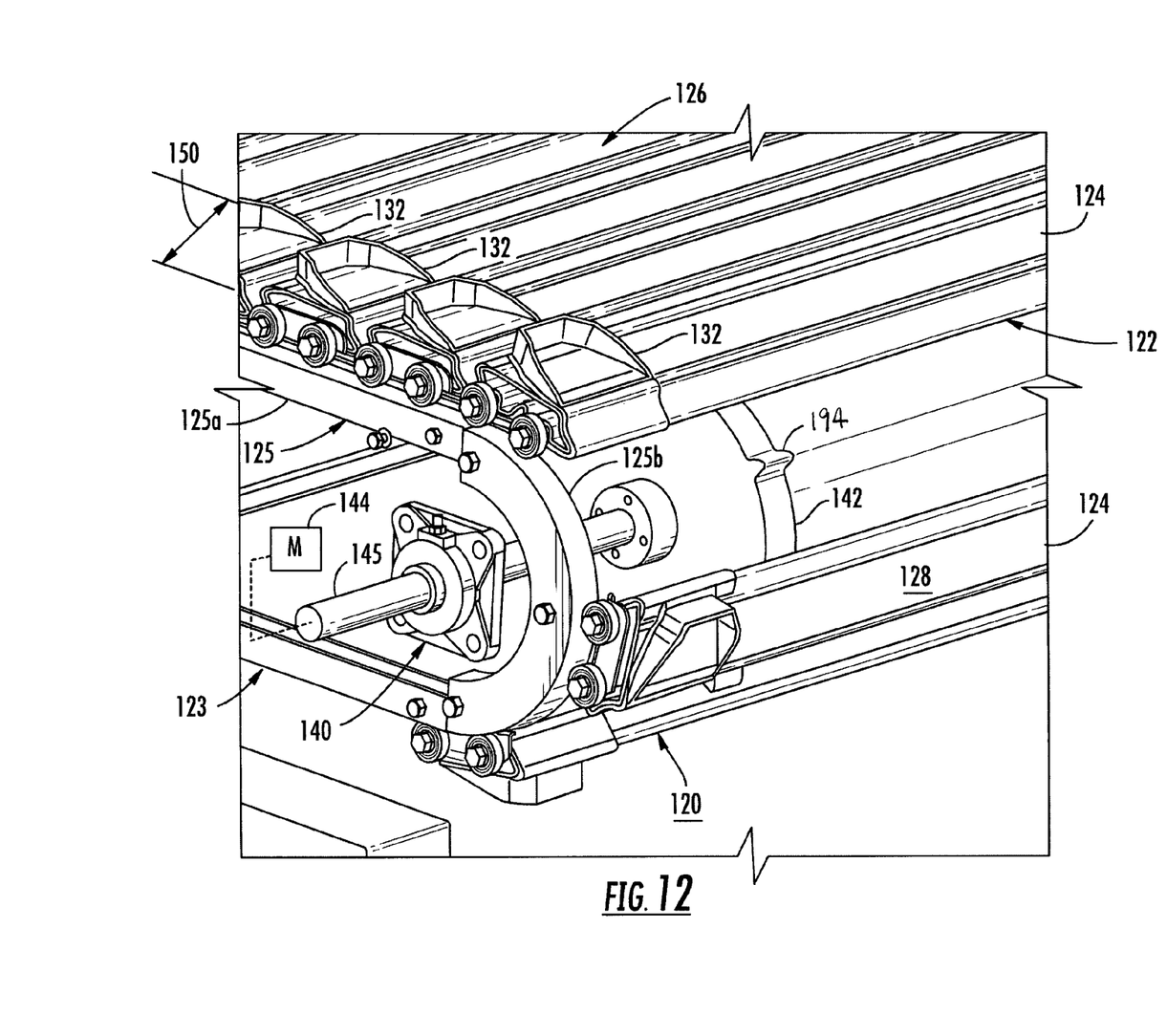
FIG. 12 is a perspective view of an alternative embodiment of an article sorter with a portion of the conveying surface removed to reveal internal details thereof.

Diverting switch assembly 80 includes an upstream facing divert arm 86 and a rotary solenoid 88 for selectively rotating arm 86 between a divert position and a non-divert position (FIG. 11). In the divert position illustrated in FIG. 11, the divert arm intercepts the pin of a diverting pin and bearing assembly 90 extending beneath the associated pusher shoe and directs the pin and bearing assembly to diverting rail 82. When not in a divert position, the divert arm is retracted and allows the pin and bearing assembly 90 to continue along in a longitudinal direction. An advantage of such a divert switch assembly is that rotary solenoid 88 can be controlled to move arm 86 to a divert position before the diverting pin and bearing assembly of the prior pusher shoe has fully cleared the divert switch assembly. This increases the speed of the divert cycle. A faster divert speed cycle allows the length of slats 24 in the direction of movement of web 22 to be shorter without sacrificing speed of the conveying surface. It should be understood that other types of divert switch assemblies can be used such as vertical diverters of the type disclosed in commonly assigned U.S. Pat. No. 5,038,912 or magnetically actuated diverters of the type disclosed in commonly assigned U.S. Pat. No. 6,615,972, the disclosures of which are both incorporated herein by reference.

An alternative embodiment of an article sorter, designated 120 is made up of an endless web 122 that is moveably supported by a frame assembly 123 (FIGS. 12 through 15.). Web 122 is made up of a plurality of laterally elongated slats 124. An upper portion of web 122 defines a conveying surface 126 moving in a longitudinal direction. Each slat 124 may have an upper surface 128 and a lower surface 130. Upper surface 128 is generally flat, or planar, such that article sorter 120 is known as a flat-top sorter. It should be understood that considerable variation in the shape of upper surface 128 from a true plane can be accommodated without negating it being generally flat or planer. Article sorter 120 additionally includes a plurality of pusher shoes 132 which travel with the web in the longitudinal direction and can be diverted laterally in order to displace an article traveling on conveying surface 126. Pusher shoes 132 travel along one or more slats and can be of any configuration known in the art. Examples of pusher shoes 132 are disclosed in commonly assigned U.S. Pat. Nos. 5,127,510; 6,814,216; and 6,860,383; and U.S. Patent Application Publication No. 2005/0023108, the disclosures of which are hereby collectively incorporated herein by reference. Also, a lateral stabilizer 133 is defined between each pusher shoe 132 and slat 124 as described in the preceding patents.

Frame assembly 123 includes a track assembly 125 that supports web 122 for movement throughout its endless path. Track assembly 125 includes an upper track portion 125a that supports the upper portion of web 122 that defines the conveying surface. Track assembly 125 further includes an end track portion 125b that supports web 122 as it transitions from the conveying surface to a lower return portion of the web. Although track assembly 125 is illustrated for supporting the web at one lateral end of the slats, it should be understood that another track assembly is provided on the opposite lateral side of the frame assembly to support the web at the opposite lateral end of the slats.

Web 122 is propelled by a drive assembly 140 which engages the web at end track portion 125b. Drive assembly 140 includes at least one sprocket 142, although two are used in the illustrated embodiment, and an electric motor 144 for rotating the sprocket(s). In the illustrative embodiment, motor 144 drives a shaft 145 which rotatably supports sprocket(s) 142. Connection between the motor and shaft may be by cog belt and sheaves, direct coupling, or the like. In the illustrative embodiment, the motor is electrically actuated by a variable frequency drive which allows conveying surface 126 to be driven within a range of speeds. However, fixed speed or other forms of variable speed drives may be used. Alternatively, the motor may be in the form of a motorized roller in which the motor windings are internal to the roller and drive an outer shell to which the sprocket(s) are attached. As previously set forth, such motorized rollers are well known in the art and come in various configurations including alternating current, direct current, gear driven, direct driven, and the like.

Each sprocket 142 may be positioned laterally between a lateral portion 150 of conveying surface 126, where non-diverted pusher shoes are located, and a lateral portion of the conveying surface (not shown), opposite to portion 150, where diverted pusher shoes are located. This placement of sprocket(s) 142 avoids interference with the pusher shoes while allowing the pusher shoes to be closer to the lateral edge of the conveying surface at the end of the divert than if the sprocket(s) were to be located at extreme ends of shaft 145. This reduces the overall width of the conveying surface without restricting the article conveying area and ensures a more reliable divert by providing guidance of the article until it is essentially fully off of the conveying surface.

Web 122 may be supported on track assembly 125 by a wheel assembly 134. Wheel assembly 134 includes a series of wheels 136 and links 138 (FIG. 10). In the illustrated embodiment, two wheels are mounted to each end of each slat 124 and adjacent slats are joined by links 138. Links 138 may pivot about bushings 135 which may also rotatably support a wheel 136, all of which may be retained by a fastener 137 to accommodate rotation between slats as they move around the ends of the web, as illustrated in FIGS. 5 and 5a. Fastener 137 engages an opening 139 in the slat, such as by threads, press fit, or the like. Alternatively the link and wheel may be rotatably mounted on a common axle, by separate axles, or the like. The axle may be fixed to the slat by press-fit, by fasteners, or the like. Other arrangements for interconnecting and supporting slats 24, such as chains, links, or the like, are known in the art and may also be used.

Sprocket(s) 142 and slats 124 have engaging surface portions defined between the sprocket(s) and the slats that propel the web. These complementary surface portions may include an extension 194 of the sprocket which engages a depression, or slot, 195 of the slat, although the extension could be on the slat and the slot on the sprocket. Extension 194 and slot 195 may have generally the same, but complementary, surface configurations. In the illustrative embodiment, extension 194 is configured as a gear tooth having sloped leading surface 196a and sloped trailing surface 196b. Leading surface 196a has a slope, such as approximately 15 degrees, that is steeper than trailing surface 196b to impart a propelling force to the slat, but is sloped to allow smooth engagement with the slat according to gear design parameters.

As is conventional, slats 124 may be made of metal, such as extruded aluminum. In the illustrated embodiment, extensions 194 are made from an impact-absorbing material, such as a polymeric material. Examples of such material include polyurethane, nylon, Delran, and others, which are known to the skilled artisan. However, extensions may be made of other materials, including metals, and the like. The entire sprocket 142 including extensions 194 may be formed as a unitary piece from one material. Alternatively, extensions 194 may be mounted as inserts in a hub of sprocket 142 that may thus be made from a different material. This would allow the hub to be made from a material, such as metal, that may be stronger and less costly than the material of the extensions. Also, this may allow worn or broken extensions to be replaced without the necessity to replace the entire sprocket.

As is conventional, each pusher shoe 132 may include a pin 198 for diverting of the pusher shoe to a diverting rail by a diverter switch and a bearing 199 for engagement of the diagonal diverting rail (not shown in FIG. 15) to laterally propel the pusher shoe to divert an article. Pusher shoe 132 may include a fastener 200 that is an extension of guide pin 198 and which rotatably supports bearing 199. In the illustrative embodiment, the upper end of fastener 200 is allowed to extend into slot 195. This may reduce the vertical footprint of the pusher shoe and slat.

Figure 13:
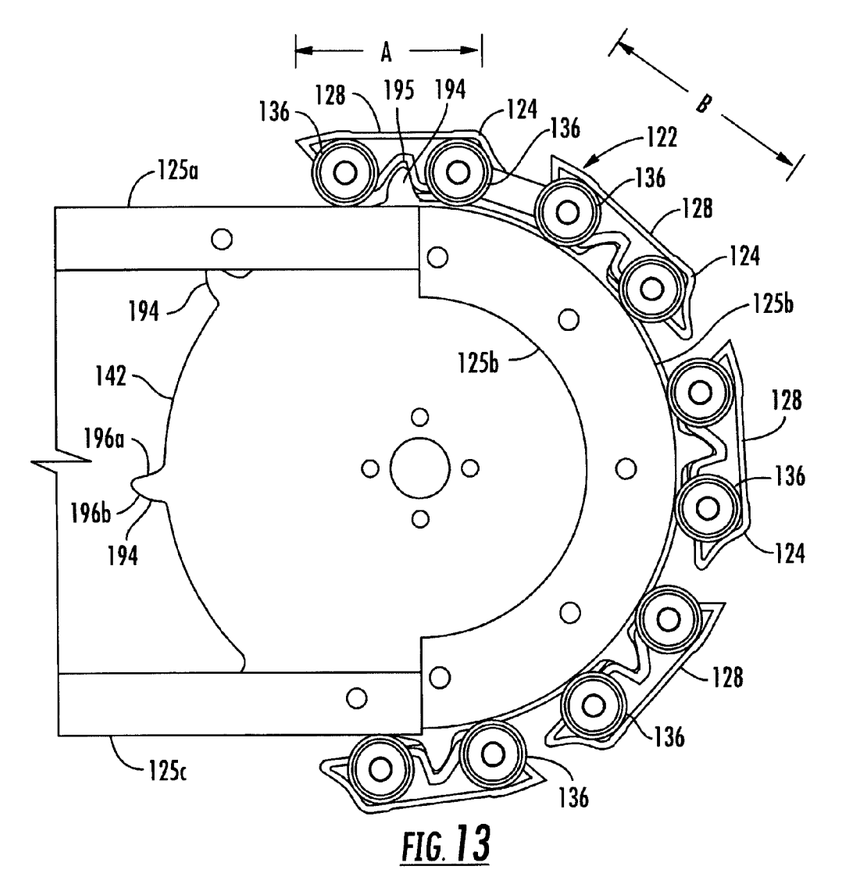
FIG. 13 is a side elevation of the article sorter in FIG. 12.
Figure 14:
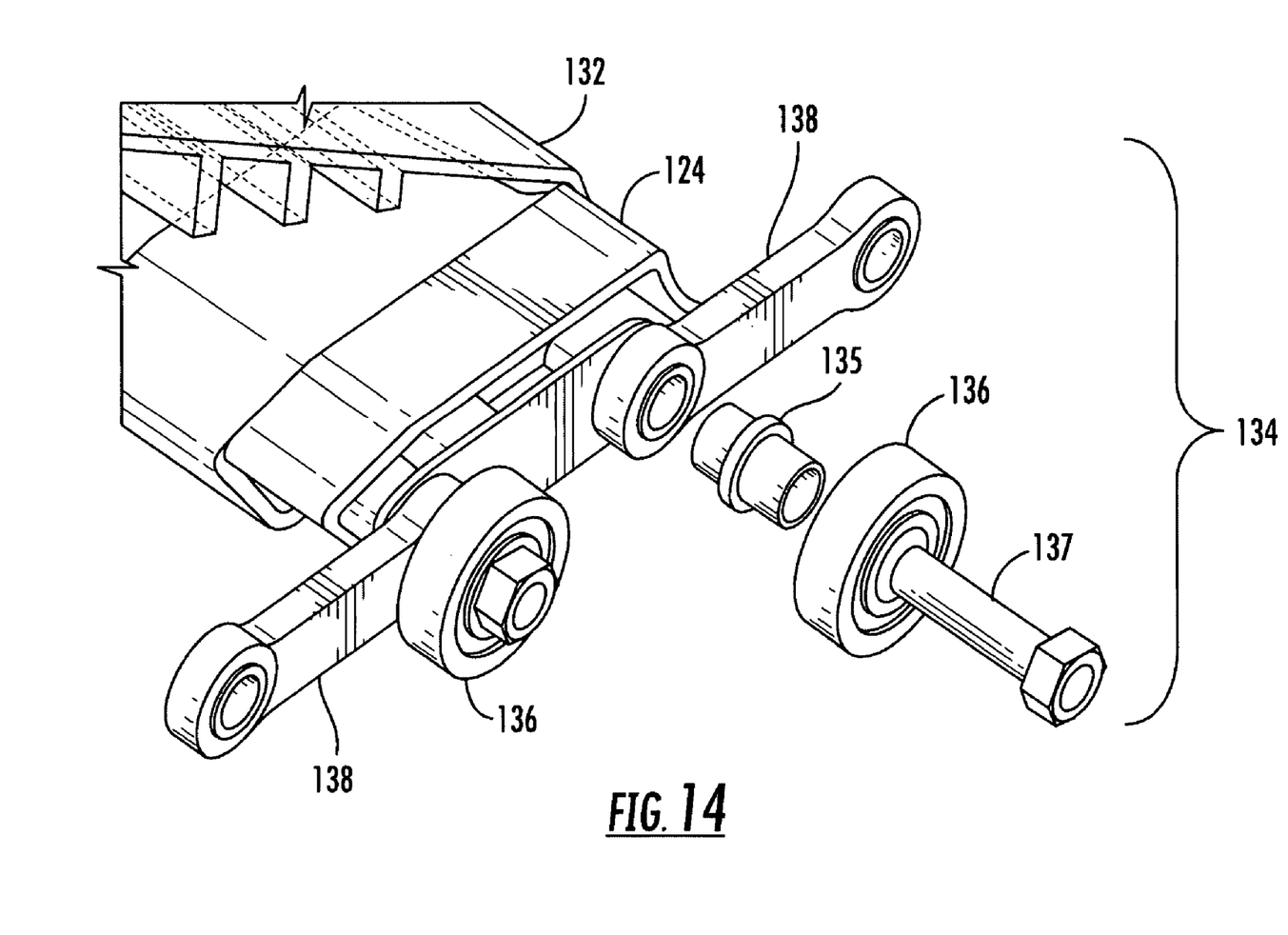
FIG. 14 is an perspective view of the lateral end of a slat in FIG. 12 illustrating a wheel assembly.
Figure 15:
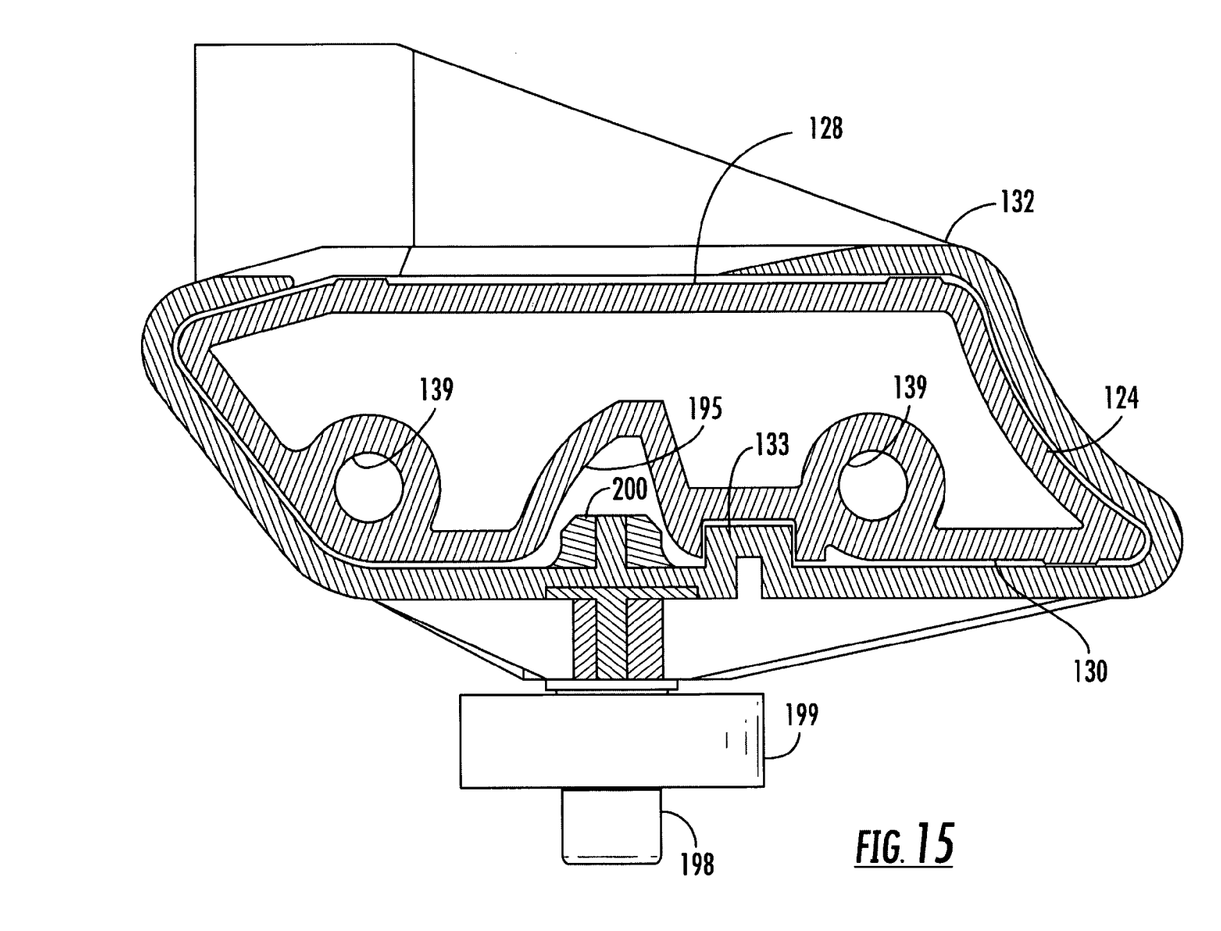
FIG. 15 is a sectional view of a slat and pusher shoe in the embodiment of FIG. 12.

Referring now to FIG. 13, it can be seen how the slats may be guided around the driven end of the web by the combination of sprocket(s) 142 and track assembly 125. As a slat 124, supported by its wheels 136 on track assembly 125, approaches the transition from the planar upper track portion 125a to the curved end track portion 125b, the slat is in the position illustrated as "A" in FIG. 13. In this position, one extension 194 of sprocket 142 is entering slot 195. It can be seen that the extension has not yet fully entered the slot and that there is a space between the end of the extension and the bottom of the slot. This is a result of the geometry of the slat and the sprocket including the positioning of the slot between the wheels. In particular, because the wheels 136 of a slat is position "A" are on a relatively planar surface extension 194 only extends partially into slot 195. However, as the slat moves toward position "B" in FIG. 13, the wheels 136 are fully on the curved surface of end track portion 125*b*. This results in relative movement of extension 194 and slot 195 to fully seat the extension in the slot. This is because the slot is between the wheels. When the wheels sit on a curved surface, the distance between the slot and the sprocket is less than when the wheels sit on a flat surface, as would be understood by the skilled artisan.

Thus, when an extension enters a slot of a slat in position "A," there is only partial engagement between the extension and the slot. As the slat then moves onto the curved track portion, full engagement is achieved between the sprocket and the slat but at a relatively gradual rate. This may facilitate a reduction in vibration and noise. Moreover, motion of the slats as they travel past the drive assembly is guided by end track portion 125*b*, not the outer surface of sprocket 142. This results in a smoother motion of the web at the drive assembly which may also facilitate a reduction in vibration and noise.

Track assembly 125 may include one or more bottom track sections 125*c* to guide the return portion of the web. It may also include another curved end track portion (not shown) that is opposite to the driven end of the web. In this manner, the track assembly may be a generally continuous track to guide motion of the web throughout its endless travel. While bottom section 125*c* is shown guiding the web from above as the web comes out of engagement with the sprocket, it may include a portion that supports the web from below against the force of gravity. The bottom track section may also include one or more sections to modify the motion of the lower run of the web including a take-up assembly, if desired.

Thus, it is seen that the disclosed embodiments illustrate a new and unique positive displacement sorter. Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. An article sorter, comprising:
   a web defined by a plurality of interconnected laterally elongated slats, an upper portion of said web defining a longitudinally extending conveying surface, each of said slats having a generally planar upper surface forming a portion of said conveying surface;
   a pair of wheel assemblies, one at each lateral side of said web;
   said wheel assemblies interconnecting said slats to form said web and moveably supporting said web;
   a plurality of pusher shoes travelling laterally of said conveying surface to laterally displace articles on said conveying surface, each of said pusher shoes travelling along one of said slats and having at least one portion between that one of said slats and an adjacent one of said slats; and
   a drive assembly, said drive assembly including a sprocket and a motor, said motor rotating said sprocket, said sprocket engaging said slats to propel said web.

2. The article sorter as claimed in claim 1 wherein said pusher shoes are at a first lateral portion of said web when in a non-diverted state and at a second opposite lateral portion of said web when in a diverted state, said pusher shoes traveling between said first and second lateral portions to divert an article, wherein said sprocket engages said slats between said first and second lateral portions of said web.

3. The article sorter as claimed in claim 1 comprising at least two said sprockets.

4. The article sorter as claimed in claim 1 wherein said sprocket is made at least in part from a polymeric material.

5. The article sorter as claimed in claim 4 wherein said polymeric material comprises at least one chosen from polyurethane, nylon and Delran.

6. The article sorter as claimed in claim 1 wherein said motor comprises a motorized roller and wherein said sprocket is mounted to an outer surface of said motorized roller.

7. The article sorter as claimed in claim 1 wherein said sprocket is mounted to a shaft and said motor rotates said shaft.

8. The article sorter as claimed in claim 1 wherein said sprocket engages said slats between leading and trailing edges of said slats.

9. The article sorter as claimed in claim 8 wherein each said wheel assembly comprises a plurality of longitudinally spaced wheels at each of said slats wherein said sprocket engages each of said slats longitudinally between said wheels for that slat.

10. The article sorter as claimed in claim 1 wherein each said wheel assembly comprises a plurality of longitudinally spaced wheels at each of said slats wherein said sprocket engages each of said slats longitudinally between said wheels for that slat.

11. The article sorter as claimed in claim 10 wherein said extension is formed as a gear tooth.

12. An article sorter, comprising:
    a web defined by a plurality of interconnected laterally elongated slats, an upper portion of said web defining a longitudinally extending conveying surface, each of said slats having a generally planar upper surface forming a portion of said conveying surface;
    a plurality of pusher shoes travelling laterally of said conveying surface to laterally displace articles on said conveying surface; and
    a drive assembly, said drive assembly including a sprocket and a motor, said motor rotating said sprocket; and
    complementary surface portions defined between said sprocket and said slats to propel said web, wherein said complementary surface portions comprising an extension of said sprocket or said slats engaging a recess in the other of said sprocket or said slats, wherein said complimentary surface portions further comprising a sloped leading surface portion of said extension engaging a leading surface portion of said recess and a sloped trailing surface portion of said extension engaging a trailing surface portion of said recess to provide smooth engagement between said extension and said recess.

13. The article sorter as claimed in claim 12 wherein said extension is formed as a gear tooth.

14. The article sorter as claimed in claim 12 wherein said extension is made from a polymeric material.

15. The article sorter as claimed in claim 14 wherein said polymeric material comprises at least one chosen from polyurethane, nylon and Delran.

16. The article sorter as claimed in claim 12 wherein said pusher shoes are at a first lateral portion of said web when in a non-diverted state and at a second opposite lateral portion of said web when in a diverted state, said pusher shoes traveling between said first and second lateral portions to divert an article, wherein said sprocket engages said slats between said first and second lateral portions of said web.

17. The article sorter as claimed in claim 12 comprising at least two said sprockets.

18. The article sorter as claimed in claim 12 wherein said motor comprises a motorized roller and wherein said sprocket is mounted to an outer surface of said motorized roller.

19. The article sorter as claimed in claim 12 wherein said sprocket is mounted to a shaft and said motor rotates said shaft.

20. The article sorter as claimed in claim 12 wherein said extension is at said sprocket and said recess is at said slats.

21. The article sorter as claimed in claim 12 wherein said leading surface portion has a slope that is steeper than a slope of said trailing surface portion.

22. An article sorter, comprising:
a web defined by a plurality of interconnected laterally elongated slats, an upper portion of said web defining a longitudinally extending conveying surface, each of said slats having a generally planar upper surface forming a portion of said conveying surface;
a plurality of pusher shoes travelling laterally of said conveying surface to laterally displace articles on said conveying surface;
a drive assembly, said drive assembly including a sprocket and a motor, said motor rotating said sprocket, said sprocket engaging said slats to propel said web; and
a track assembly, said track assembly including an upper track portion and an end track portion, said upper track portion supporting said upper portion of said web, said end track portion supporting an end portion of said web at said sprocket, wherein said end portion of said web is guided by a combination of said end track portion and said sprocket to reduce vibration and noise while propelling said web.

23. The article sorter as claimed in claim 22 including a wheel assembly supporting each lateral side of said web, said wheel assembly engaging said track.

24. The article sorter as claimed in claim 23 wherein said wheel assembly comprises a plurality of longitudinal spaced wheels at each of said slats, wherein said sprocket engages each of said slats longitudinally between said plurality of wheels for that slat.

25. The article sorter as claimed in claim 22 wherein said track assembly comprises a generally continuous track assembly.

26. The article sorter as claimed in claim 22 wherein said pusher shoes are at a first lateral portion of said web when in a non-diverted state and at a second opposite lateral portion of said web when in a diverted state, said pusher shoes traveling between said first and second lateral portions to divert an article, wherein said sprocket engages said slats between said first and second lateral portions of said web.

27. The article sorter as claimed in claim 22 comprising at least two said sprockets.

28. The article sorter as claimed in claim 22 wherein said sprocket is made at least in part from a polymeric material.

29. The article sorter as claimed in claim 28 wherein said polymeric material comprises at least one chosen from polyurethane, nylon and Delran.

30. The article sorter as claimed in claim 22 wherein said motor comprises a motorized roller and wherein said sprocket is mounted to an outer surface of said motorized roller.

31. The article sorter as claimed in claim 22 wherein said sprocket is mounted to a shaft and said motor rotates said shaft.

32. An article sorter, comprising:
a web defined by a plurality of interconnected laterally elongated slats, an upper portion of said web defining a longitudinally extending conveying surface, each of said slats having a generally planar upper surface forming a portion of said conveying surface and a lower surface opposite said upper surface;
a plurality of pusher shoes adapted to travel laterally of said conveying surface to laterally displace articles on said conveying surface;
a drive assembly, said drive assembly propelling said web, said drive assembly including at least one sprocket and a motor, said motor rotating said at least one sprocket, said lower surface defined by a first protrusion and a second protrusion spaced from said first protrusion, wherein said at least one sprocket engaging said lower surface of said slats in a void between said first and second protrusions in order to propel the slats.

33. The article sorter as claimed in claim 32 wherein said at least one sprocket comprises at least two sprockets.

34. The article sorter as claimed in claim 32 wherein said at least one sprocket includes a portion engaging said slats, said portion engaging said slats made from an impact absorbing material.

35. The article sorter as claimed in claim 32 wherein said first and second protrusions are generally arcuate in cross section.

36. The article sorter as claimed in claim 32 including a wheel assembly supporting each lateral side of said web, each said wheel assembly engaging a lateral end of said slats.

37. An article sorter, comprising:
a web defined by a plurality of interconnected laterally elongated slats, an upper portion of said web defining a longitudinally extending conveying surface, each of said slats having a generally planar upper surface forming a portion of said conveying surface and a lower surface opposite said upper surface;
a plurality of pusher shoes adapted to travel laterally of said conveying surface to laterally displace articles on said conveying surface;
a drive assembly, said drive assembly propelling said web, said drive assembly including at least one sprocket and a motor, said motor rotating said at least one sprocket, said at least one sprocket engaging said lower surface of said slats, wherein said pusher shoes are at a first lateral end portion of said web when in a non-diverted state and a second opposite lateral end portion of said web when in a diverted state, said pusher shoes traveling between said first and second lateral end portions to divert an article, wherein said at least one sprocket comprises at least two sprockets, wherein all of said at least two sprockets engage said slats laterally inward of said first and second lateral end portions of said web thereby allowing said pusher shoes to be adjacent respective lateral edges of said conveying surface in said non-diverted state and diverted state without interference between said pusher shoes and each of said at least two sprockets to provide guidance of an article until that article is diverted from said conveying surface.

38. The article sorter as claimed in claim 37 wherein said at least one sprocket includes a portion engaging said slats, said portion engaging said slats made from an impact absorbing material.

39. The article sorter as claimed in claim 37 including a wheel assembly supporting each lateral side of said web, each said wheel assembly engaging a lateral end of said slats.

* * * * *